United States Patent
Nakayama et al.

(10) Patent No.: US 7,969,652 B2
(45) Date of Patent: Jun. 28, 2011

(54) MICROSCOPE DEVICE AND IMAGE PROCESSING METHOD

(75) Inventors: Hiroaki Nakayama, Kawasaki (JP); Hisao Osawa, Kashiwa (JP); Yumiko Ouchi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/453,554

(22) Filed: May 14, 2009

(65) Prior Publication Data

US 2009/0225407 A1  Sep. 10, 2009

Related U.S. Application Data

(63) Continuation of application No. PCT/JP2007/073781, filed on Dec. 10, 2007.

(30) Foreign Application Priority Data

Dec. 12, 2006  (JP) .................................. 2006-334211

(51) Int. Cl.
G02B 21/00  (2006.01)
(52) U.S. Cl. ....................................................... 359/370
(58) Field of Classification Search .................. None
See application file for complete search history.

(56) References Cited

U.S. PATENT DOCUMENTS

RE38,307 E   11/2003  Gustafsson et al.

FOREIGN PATENT DOCUMENTS

| JP | A-11-242189 | 9/1999 |
|---|---|---|
| JP | A-2002-196253 | 7/2002 |
| JP | A-2007-199397 | 8/2007 |
| JP | A-2007-199571 | 8/2007 |
| JP | A-2007-199572 | 8/2007 |

OTHER PUBLICATIONS

Lukosz, "Optical Systems with Resolving Powers Exceeding the Classical Limit. II," *Journal of the Optical Society of America*, 1967, vol. 57, No. 7, pp. 932-941.

Lukosz et al., "Optischen Abbildung unter Uberschreitung der beugungsbedingten Auflosungsgrenze," 1963, pp. 241-255.

*Primary Examiner* — Stephone B Allen
*Assistant Examiner* — Derek S Chapel
(74) *Attorney, Agent, or Firm* — Oliff & Berridge, PLC

(57) ABSTRACT

A diffraction grating produces first diffraction light in a symmetrical direction with respect to the 0-th diffraction light and the optical axis. Each light flux forms two flux interference patterns on a sample surface through first and second objective lenses. A sample is illuminated by spatially modulated illumination light. Fluorescence is generated on the sample by structured illumination light as excitation light. The fluorescence caught by the first objective lens forms a modulated image of the sample on a sample conjugate surface through an objective optical system including the first and second objective lenses. The modulated image is further modulated through the diffractive grating. Fluorescence from the further modulated image passes through a lens and a dichroic mirror, enters into a single light path of an observation optical system, passes through a fluorescent filter, and forms an enlarged image of the further modulated image through a lens.

16 Claims, 11 Drawing Sheets

MICROSCOPE DEVICE AND IMAGE PROCESSING METHOD

TECHNICAL FIELD

The present invention relates to a microscope apparatus and an image processing method.

BACKGROUND ART

A technique of spatially modulating illumination light can be cited as an example of a technique of performing super-resolution observation of an observation object such as a biological specimen. For example, the technique of spatially modulating illumination light is described in Japanese Patent Application Laid-Open No. 11-242189 (Patent Document 1), U.S. Reissued Patent No. 38307 (Patent Document 2), W. Lukosz, "Optical systems with resolving powers exceeding the classical limit. II", Journal of the Optical Society of America, Vol. 37, PP. 932, 1967 (Non-Patent Document 1), and W. Lukosz and M. Marchand, Opt. Acta. 10, 241, 1963 (Non-Patent Document 2).

In these techniques, a spatial frequency of a structure of the observation object is modulated with the spatially modulated illumination light, and information on the high spatial frequency exceeding a resolution limit is caused to contribute to image formation of a microscope optical system. However, in order to observe a super-resolution image, it is necessary to demodulate a modulated image of the observation object (modulated image). The demodulation method is mainly fallen into optical demodulation (see Non-Patent Document 1 and 2) and computing demodulation (see Patent Documents 1 and 2). The optical demodulation is realized by re-modulation of the modulated image with a spatial modulation element such as a diffraction grating.

Patent Document 1: Japanese Patent Application Laid-Open No. 11-242189

Patent Document 2: U.S. Reissued Patent No. 38307

Non-Patent Document 1: W. Lukosz, "Optical systems with resolving powers exceeding the classical limit. II", Journal of the Optical Society of America, Vol. 37, PP. 932, 1967

Non-Patent Document 2: W. Lukosz and M. Marchand, Opt. Acta. 10, 241, 1963

However, the computing demodulation takes time because of complicated arithmetic processing, and the observation object is hardly observed in real time. On the other hand, the optical demodulation does not take much time because of the use of the spatial modulation element such as a diffraction grating. However, because demodulation accuracy depends on shape accuracy and arrangement accuracy of the spatial modulation element, a good super-resolution image is hardly obtained.

For example, in the demodulation method (optical demodulation) described in Non-Patent Document 2, an optical path for the modulation and an optical path for the demodulation are provided in parallel, and different portions of the common diffraction grating are used in the modulation and the demodulation, thereby improving the problem of the arrangement accuracy. However, unfortunately an observation field is extremely narrowed because a pupil of the optical system relating to the modulation and a pupil of the optical system relating to the demodulation cannot be conjugated.

In view of the foregoing, a problem of the invention is to provide a microscope apparatus which can produce the information on the super-resolution image in short time and an image processing method in which the super-resolution image can be obtained with the microscope apparatus.

DISCLOSURE OF THE INVENTION

In accordance with a first aspect of the invention, a microscope apparatus includes a spatial modulation element that receives irradiation light of an obliquely incident substantially parallel light flux to symmetrically generate zero-order light and first-order light with respect to the optical axis, the irradiation light being of zero-order light; an objective optical system that causes the zero-order light and the first-order light to interfere with each other at a certain position of a sample surface to form an interference fringe, the objective optical system forming an image of light from the sample surface on the spatial modulation element surface, the light from the sample surface being modulated by the interference fringe; image picking-up means; and a relay optical system that forms an image of light re-modulated by the spatial modulation element surface on an image picking-up surface of the image picking-up means.

In accordance with a second aspect of the invention, in the microscope apparatus according to the first aspect, an optical axis of an optical system in which the objective optical system and the relay optical system are combined is identical to an optical axis of an illumination optical system from a light source to the sample surface at least in a range from a site located on a light source side of the spatial modulation element to the sample surface, and the microscope apparatus includes an optical path moving optical system that shift a center axis of illumination light emitted from the light source from the identical optical axis; and an irradiation optical system that converts the illumination light passing through the optical path moving optical system into irradiation light having a substantially parallel light flux, the irradiation light being obliquely incident to the spatial modulation element.

In accordance with a third aspect of the invention, in the microscope apparatus according to the second aspect, the illumination optical system is a part of the relay optical system.

In accordance with a fourth aspect of the invention, the microscope apparatus according to the second or third aspect includes a collector lens that converts divergent illumination light from the light source into a substantially parallel light flux; a collimator lens that collects the illumination light transmitted through the collector lens to form a secondary light source; and an optical path deflecting member that reflects the illumination light transmitted through the collimator lens to cause a principal ray of the reflected illumination light to travel in a direction of the sample surface on the optical axis of the relay optical system, the optical path deflecting member causing the principal ray to impinge on the optical path moving optical system, wherein the principal ray of the illumination light is incident to the optical path moving optical system through a center of the collector lens, a center of the collimator lens, and the optical axis of the relay optical system.

At this point, the optical path deflecting member includes a mirror, a prism, a dichroic mirror, or a dichroic prism, which transmits and reflects the light with a predetermined ratio. The principal ray means a ray having the strongest intensity, which exits from the center of the light source.

In accordance with a fifth aspect of the invention, the microscope apparatus according to the second or third aspect includes a collector lens that converts illumination light divergent from the light source into a substantially parallel light flux; a collimator lens that collects the illumination light transmitted through the collector lens to form a secondary light source; and an optical path deflecting member that reflects the illumination light transmitted through the collimator lens to cause a principal ray of the reflected illumination light to travel in a direction of the sample surface parallel to the optical axis of the relay optical system, the optical path deflecting member causing the principal ray to impinge on the irradiation optical system, wherein the illumination light emitted from the light source is incident to the collector lens after passing through the optical path moving optical system, and the illumination light is incident to the illumination optical system after reflected from the optical path deflecting member.

In accordance with a sixth aspect of the invention, in the microscope apparatus according to the second to fifth aspect, the spatial modulation element can be rotated about the optical axis, the optical path moving optical system can be rotated about the optical axis, and a rotation amount of the spatial modulation element can be set equal to a rotation amount of the principal ray that is rotated when the optical path moving optical system is rotated.

In accordance with a seventh aspect of the invention, in the microscope apparatus according to the second to fifth aspect, the spatial modulation element can be rotated about the optical axis, plural optical elements that move the optical path are provided in the optical path moving optical system, the plural optical elements respectively move the optical path in different directions perpendicular to the optical axis, and any of the plural optical elements can be selected for use according to a rotation amount of the spatial modulation element.

In accordance with an eighth aspect of the invention, in the microscope apparatus according to the first aspect, an optical system in which the objective optical system and the relay optical system are combined is identical to an illumination optical system from a light source to the sample surface at least in a range from a site located on a light source side of the spatial modulation element to the sample surface, and the microscope apparatus includes a light source that is provided at a position distant from the optical axis of the illumination optical system; a collector lens that converts illumination light divergent from the light source into a substantially parallel light flux; a collimator lens that collects the illumination light transmitted through the collector lens to form a secondary light source; an optical path deflecting member that reflects the illumination light transmitted through the collimator lens to cause a principal ray of the reflected illumination light to travel in a direction of the sample surface parallel to the optical axis of the relay optical system; and an irradiation optical system that converts the illumination light reflected from the optical path deflecting member into irradiation light having a substantially parallel light flux, the irradiation light being obliquely incident to the spatial modulation element.

In accordance with a ninth aspect of the invention, in the microscope apparatus according to the eighth aspect, the irradiation light optical system is a part of the relay optical system.

In accordance with a tenth aspect of the invention, in the microscope apparatus according to the eighth and ninth aspect, the spatial modulation element can be rotated about the optical axis, the light source can be rotated about the optical axis of the illumination optical system, and the spatial modulation element and the light source can be set at an identical rotation amount.

In accordance with an eleventh aspect of the invention, in the microscope apparatus according to the eighth or ninth aspect, the spatial modulation element can be rotated about the optical axis, plural light sources are provided, the plural light sources respectively move the optical path in different directions perpendicular to the optical axis, and any of the plural light sources can be selected for use according to a rotation amount of the spatial modulation element.

In accordance with a twelfth aspect of the invention, in the microscope apparatus according to any one of the first to eleventh aspects, a phase of the interference fringe formed on the sample surface by the spatial modulation element and the objective optical system can be changed, and an imaging time of the image picking-up means is substantially same as an integral multiple of a period for phase changing.

In accordance with a thirteenth aspect of the invention, an image processing method includes picking up plural images of a sample with the microscope apparatus as in any one of the sixth, seventh, tenth, and eleventh aspects while the rotation amount of the spatial modulation element is changed; performing Fourier transform to plural pieces of obtained image data to obtain plural pieces of Fourier transform image data; performing deconvolution processing to the plural pieces of Fourier transform image data on a two-dimensional plane in consideration of MTF to synthesize the plural pieces of Fourier transform image data; and performing inverse Fourier transform to obtain image data.

Accordingly, the invention can provide the microscope apparatus that can produce the information on the super-resolution image at high speed and the image processing method in which the accurate image can be obtained with the microscope apparatus.

Figure 1:
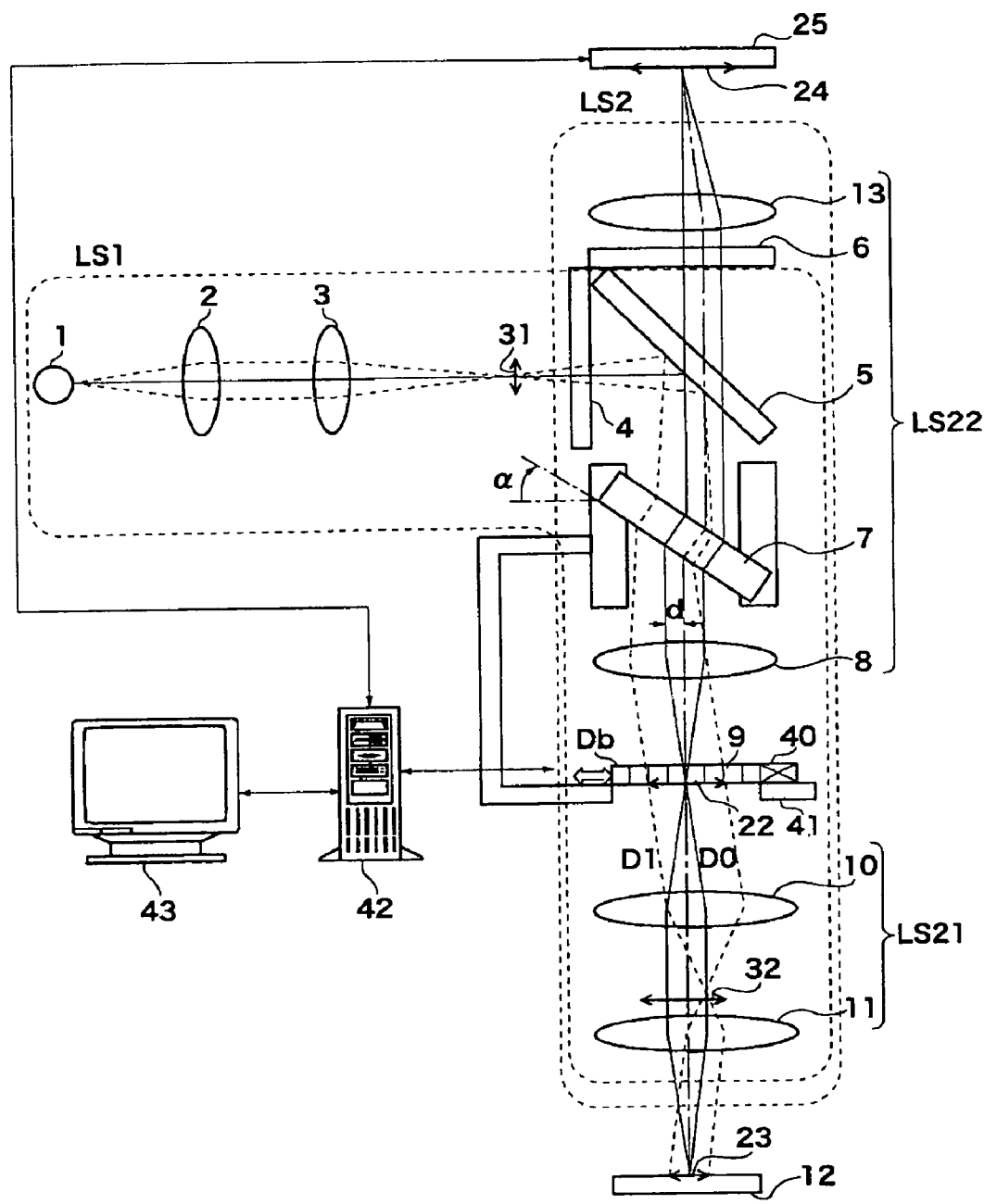
FIG. 1 is a view showing an outline of an optical system of a microscope apparatus according to a first embodiment of the invention.

EXPLANATIONS OF LETTERS OR NUMERALS 1 light source
2 collector lens 3 collimator lens
4 exciter filter
5 dichroic mirror
6 barrier filter
7 parallel-plate glass
8 lens
9 diffraction grating
10 second objective lens
11 first objective lens
12 specimen (fluorescent sample)
13 lens
14 image rotator
22 specimen conjugate plane
23 image
24 magnified image
25 image picking-up device
31 light source image (pupil conjugate plane)
32 pupil plane of first objective lens
40 actuator
41 rotary stage
42 control and operation device
43 image display device
51 rotary stage
52 motor-driven stage
53 rotary stage
101 light source
102 to 104 mirror
105 optical fiber
105a exit end
106 optical fiber
106a exit end
107 optical fiber
107a exit end
112 and 103 beam splitter
121 rotary diffuser
122 axis
123 coupling lens
S1 to S3 shutter
LS1 illumination optical system
LS2 observation optical system
LS21 objective optical system
LS22 relay optical system
D0 zero-order light
D1 first-order light

BEST MODE FOR CARRYING OUT THE INVENTION

Exemplary embodiments of the invention will be described with reference to the drawings. FIG. 1 is a view showing an outline of an optical system of a microscope apparatus according to a first embodiment of the invention. The microscope apparatus includes a light source 1, a collector lens 2, a collimator lens 3, an exciter filter 4, a dichroic mirror 5, a barrier filter 6, a parallel-plate glass 7 which is of an optical path moving optical system, a lens 8 which is of an illumination optical system, a diffraction grating 9 which is of a spatial modulation element, a second objective lens 10, a first objective lens 11, a lens 13, an image picking-up device (such as a CCD camera) 25, a control and operation device (such as a circuit and a computer) 42, an image display device 43, an actuator 40, and a rotary stage 41. In the microscope apparatus, an image formed by fluorescence generated from a specimen (fluorescent sample) 12 is taken by the image picking-up device 25 for processing.

The light source 1, the collector lens 2, the collimator lens 3, the exciter filter 4, the dichroic mirror 5, the parallel-plate glass 7, the lens 8, the diffraction grating 9, the second objective lens 10, and the first objective lens 11 constitute an illumination optical system LS1. The first objective lens 11, the second objective lens 10, the diffraction grating 9, the lens 8, the parallel-plate glass 7, the barrier filter 6, the dichroic mirror 5, and the lens 13 constitute an observation optical system LS2. The first objective lens 11 and the second objective lens 10 constitute an objective optical system LS21, and the lens 8 and the lens 13 constitute a relay optical system LS22. An optical path from the first objective lens 11 to the dichroic mirror 5 is shared by the illumination optical system LS1 and the observation optical system LS2.

Divergent light from the light source 1 is converted into a parallel ray by the collector lens 2, and a light source image 31 is formed in a pupil conjugate plane by the collimator lens 3. After a wavelength of the light from the light source image 31 is selected by the exciter filter 4, the light is reflected by the dichroic mirror 5, and the light travels toward a specimen surface. In the case where a reflected image of the specimen is observed, a half mirror may be used instead of the dichroic mirror. Sometimes a polarization beam splitter can be used.

When the light passes through the parallel-plate glass 7, a ray on an optical axis (for the sake of convenience, the ray is referred to as "principal ray"), which is emitted from the center of the light source to pass through the centers of the collector lens 2 and collimator lens 3, is shifted by a predetermined distance d from the optical axis by refraction in both surfaces of the parallel-plate glass 7. Then the lens 8 converts the light into parallel ray inclined by a predetermined angle relative to the optical axis, and the diffraction grating 9 disposed in a specimen conjugate plane 22 is irradiated with the parallel ray.

In the diffraction grating 9, a grating constant is previously set such that zero-order light directly traveling in a straight line and first-order light are symmetrically generated with respect to the optical axis. The second objective lens 10 converts each light flux into the parallel ray parallel to the optical axis, and interference is generated on the specimen surface to form a two-beam interference fringe by the first objective lens 11. Therefore, the specimen 12 is illuminated with spatially modulated illumination light (structured illumination).

The diffraction grating 9 is a phase type or amplitude type diffraction grating having a one-dimensional periodic structure. The phase type diffraction grating has an advantage of a high degree of freedom in setting an intensity ratio of a diffraction order. On the other hand, the amplitude type diffraction grating has an advantage that a white light source can be used as the light source 1 because of a good wavelength characteristic. For the light source 1, a light source having a single wavelength may be used instead of the white light source, or light from a laser beam source is guided through an optical fiber and a secondary light source formed in an end face of the optical fiber may be used as the light source 1.

Desirably a negative first-order component and excessive diffraction components having orders of at least two, generated in the diffraction grating 9, are removed to form a luminance distribution of the structured illumination (luminance distribution of an image 23 of the diffraction grating 9) into a sinusoidal wave. At this point, the negative first-order component and the excessive diffraction components are removed at a proper point (for example, a pupil plane 32 of the first objective lens 11) that is located at the back of the diffraction grating 9. Alternatively, when the concentration distribution of the diffraction grating 9 is previously formed into the sinusoidal shape, the generation of the diffraction components having orders of at least two can be prevented to suppress light quantity loss.

In the first embodiment, the illumination light is incident to the diffraction grating 9 while inclined by the predetermined angle with respect to the diffraction grating 9 such that, in the lights diffracted by the diffraction grating 9, the zero-order light D0 and the first-order light D1 symmetrically generated with respect to the optical axis of the objective optical system (the second objective lens 10 and the first objective lens 11). The principal ray is shifted from the optical axis by the parallel-plate glass 7 disposed in front of the lens 8, whereby realizing the inclination of the illumination light. A shift amount d necessary to incline the illumination light by the predetermined angle can be obtained by computation from a wavelength of the light source 1, a focal distance of the lens 8, and a pitch of the diffraction grating 9.

The necessary shift amount d is obtained as follows:

$$d = f_8 \times \lambda / (2 \times P_g) \quad (1)$$

where $\lambda$ is the wavelength of the light source 1, $f_8$ is the focal distance of the lens 8, and $P_g$ is the pitch of the diffraction grating 9.

On the other hand, the shift amount d of the ray formed by the parallel-plate glass is obtained as follows:

$$d = t \times \sin\alpha \times \left(1 - \frac{\cos\alpha}{\sqrt{n^2 - \sin^2\alpha}}\right) \quad (2)$$

where n is a refractive index of the parallel-plate glass 7, t is a thickness of the parallel-plate glass 7, and $\alpha$ is a tilt angle of the parallel-plate glass 7.

As used herein, the tilt angle $\alpha$ of the parallel-plate glass 7 shall mean an angle that is rotated about a direction of a grating line of the diffraction grating 9.

Accordingly, the configuration of the optical system satisfying the equations (1) and (2) enables the zero-order light D0 and the first-order light D1 to be symmetrically generated with respect to the optical axis of the objective lens in the light diffracted by the diffraction grating 9.

The zero-order light D0 and the first-order light D1 are collected onto the pupil plane 32 of the first objective lens 11. Desirably an effect of super-resolution is enhanced when a collecting point is set at an end (at a position distant from the optical axis) of a pupil diameter of the first objective lens 11 as much as possible. At this point, in the diffracted illumination light generated by the diffraction grating 9, the light except for the zero-order light and the first-order light is not able to be incident within an effective diameter of the first objective lens 11. The zero-order light D0 and the first-order light D1 that are collected onto the pupil plane 32 of the first objective lens 11 become parallel light fluxes to go out from the objective lens, and the parallel light fluxes interfere with each other on the specimen 12 to form the two-beam interference fringe.

Therefore, fluorescence is generated on the specimen 12 while the light of the structured illumination is used as excitation light. At this point, the structure of the specimen 12 is modulated by the structured illumination when viewed from the side of the first objective lens 11. A moire fringe is generated in the modulated structure. The moire fringes is formed by a fine structure possessed by the specimen 12 and a pattern of the structured illumination, the fine structure of the specimen 12 is inverted into a spatial frequency band that is lowered by a spatial frequency of the structured illumination.

Therefore, even the light of the structure having the high spatial frequency exceeding a resolution limit is caught by the first objective lens 11.

The fluorescent light caught by the first objective lens 11 forms a modulated image of the specimen 12 on the specimen conjugate plane 22 by the objective optical system LS21 including the first objective lens 11 and the second objective lens 10. The modulated image is re-modulated by the diffraction grating 9 disposed in the specimen conjugate plane 22. The structure of the specimen 12, in which the spatial frequency is changed, is returned to the original spatial frequency in the re-modulated image. The re-modulated image includes the demodulated image of the specimen 12.

However, the re-modulated image also includes unnecessary diffraction components for the demodulated image. Examples of the unnecessary diffraction components include positive and negative first-order diffraction components generated by the diffraction grating 9 for the zero-order light of the structured illumination exiting from the specimen 12, a zero-order diffraction component for the negative first-order light by the structured illumination exiting from the specimen 12, and a zero-order diffraction component for the positive first-order light by the structured illumination exiting from the specimen 12. In order to remove the unnecessary diffraction components from the re-modulated image, averaging may be achieved by moving the diffraction grating 9 by one period or N periods (N is a natural number).

After the fluorescent light from the re-modulated image is transmitted by the dichroic mirror 5 through the lens 8, the fluorescent light enters a single optical path of the observation optical system LS2, the fluorescent light is transmitted by the barrier filter 6, and the fluorescent light forms a magnified image 24 of the re-modulated image through the lens 13. That is, the re-modulated image re-modulated by the diffraction grating 9 is relayed to the magnified image 24 by the relay optical system LS22 including the lens 8 and the lens 13. The image picking-up device 25 takes the magnified image 24 to produce image data of the re-modulated image. In the case where the magnified image 24 is taken by the image picking-up device 25, image data of a demodulated image can be obtained, when the averaging is achieved by accumulating the re-modulated image while the diffraction grating 9 is moved by one period or N periods (N is a natural number).

The image data includes information for performing super-resolution observation by the structured illumination of the specimen 12. The control and operation device 42 captures the image data, and the control and operation device 42 performs operation to supply the image data to the image display device 43.

In the microscope apparatus of the first embodiment, the optical path from the conjugate plane (specimen conjugate plane) 22 of the specimen 12 to the specimen 12 is completely shared by the illumination optical system LS1 and the observation optical system LS2, and the diffraction grating 9 is disposed in the specimen conjugate plane 22. In the microscope apparatus, the fine structure of the specimen 12 is modulated by the diffraction grating 9. The modulated fine structure of the specimen 12 is automatically re-modulated by the diffraction grating 9 disposed in the specimen conjugate plane 22.

The actuator 40 can move the diffraction grating 9 in a direction Db orthogonal to the diffraction line. The movement of the diffraction grating 9 changes the phase of the structured illumination. The control and operation device 42 controls the actuator 40 and the image picking-up device 25 such that the phase of the structured illumination is changed by one period or N periods (N is a natural number) while one-frame image data is integrated, whereby the structured illumination pattern and the unnecessary diffraction components generated in the re-modulation are eliminated from the image data.

Alternatively, a charge accumulation type image picking-up element such as CCD is used as the image picking-up element of the image picking-up device 25, and a time necessary to change the phase of the structured illumination by one period or N periods (N is a natural number) is set at an integration time, whereby the structured illumination pattern and the unnecessary diffraction components generated in the re-modulation may be eliminated from the image data.

Alternatively, an image picking-up element such as NMOS and CMOS which is not the charge accumulation type image picking-up element is used as the image picking-up element of the image picking-up device 25, and a lowpass filter or an integrating circuit is connected to an output of each pixel, whereby the structured illumination pattern and the unnecessary diffraction components generated in the re-modulation may be eliminated from the image data. At this point, at least the time necessary to change the phase of the structured illumination by one period or N periods (N is a natural number) is set at a time constant of the connected lowpass filter or integrating circuit.

The rotary stage 41 can rotate the diffraction grating 9 with the actuator 40 about the optical axis. The rotation of the diffraction grating 9 changes a structured illumination direction. Information for performing the super-resolution observation can be obtained in some orientations, when the control and operation device 42 controls the rotary stage 41 and the image picking-up device 25 to obtain the image data every time the structured illumination direction is changed to some orientations. This enables two-dimensional super-resolution observation of the specimen 12. A program necessary for the above-described behavior is previously installed in the control and operation device 42 through a recording medium such as CD-ROM or the Internet.

Figure 2:
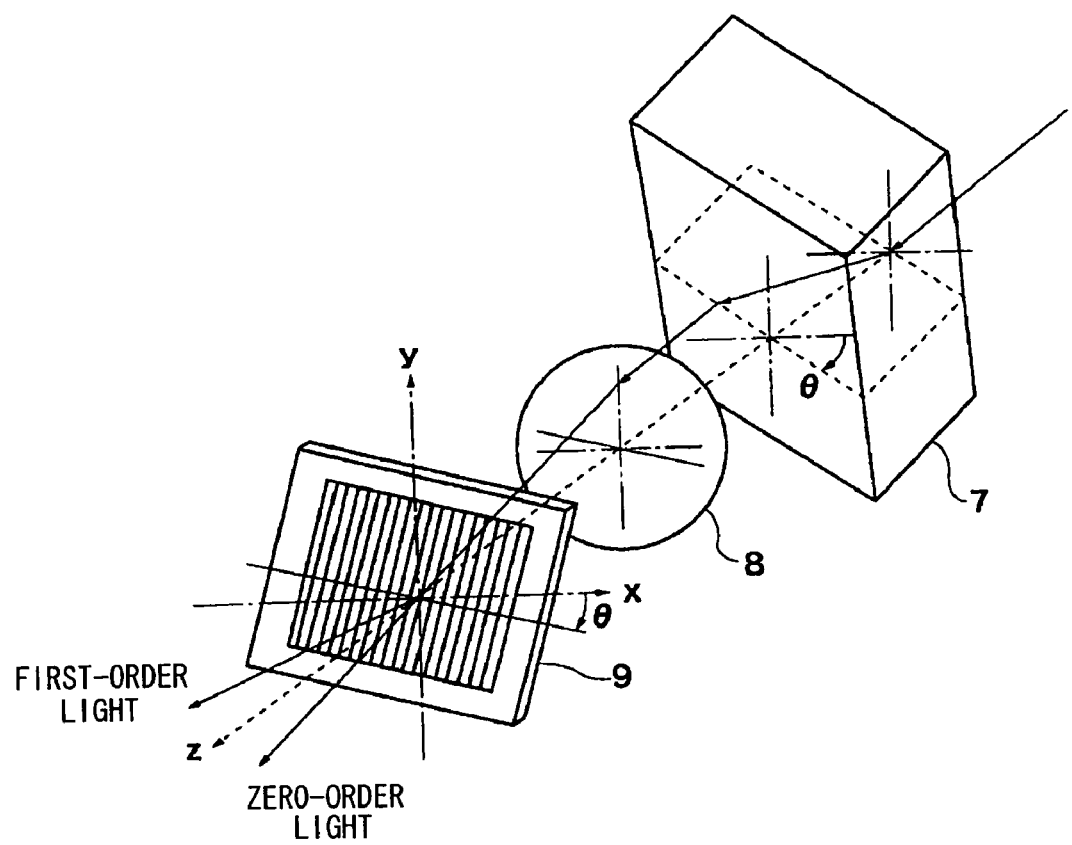
FIG. 2 is a view showing a state in which a diffraction grating is rotated about an optical axis.

In order to change the structured illumination direction, it is necessary that the oblique incidence direction of the illumination light be rotated according to the rotation of the diffraction grating 9. In rotating the diffraction grating 9, it is necessary to rotate the parallel-plate glass 7 about the optical axis. FIG. 2 is a view showing a state in which the diffraction grating 9 is rotated about the optical axis. For the diffraction grating 9, it is assumed that a right direction of a paper surface of FIG. 1 is a positive direction of an x-axis, a front side perpendicular to the paper surface is a positive direction of a y-axis, and a direction orientated toward the objective lens is a positive direction of a z-axis while the optical axis is set at the z-axis. FIG. 2 shows the state in which the diffraction grating 9 is rotated by θ about the z-axis. At this point, it is necessary to similarly rotate the parallel-plate glass 7 by θ about the z-axis. The parallel-plate glass 7 and the diffraction grating 9 are rotated about the z-axis while fixed onto the same rotary stage, thereby realizing the rotation of the parallel-plate glass 7 by θ about the z-axis. Thus, in the first embodiment, the parallel-plate glass 7 and the diffraction grating 9 are rotated while fixed onto the same rotary stage, so that the orientation of the oblique illumination can accurately be reproduced.

Figure 3:
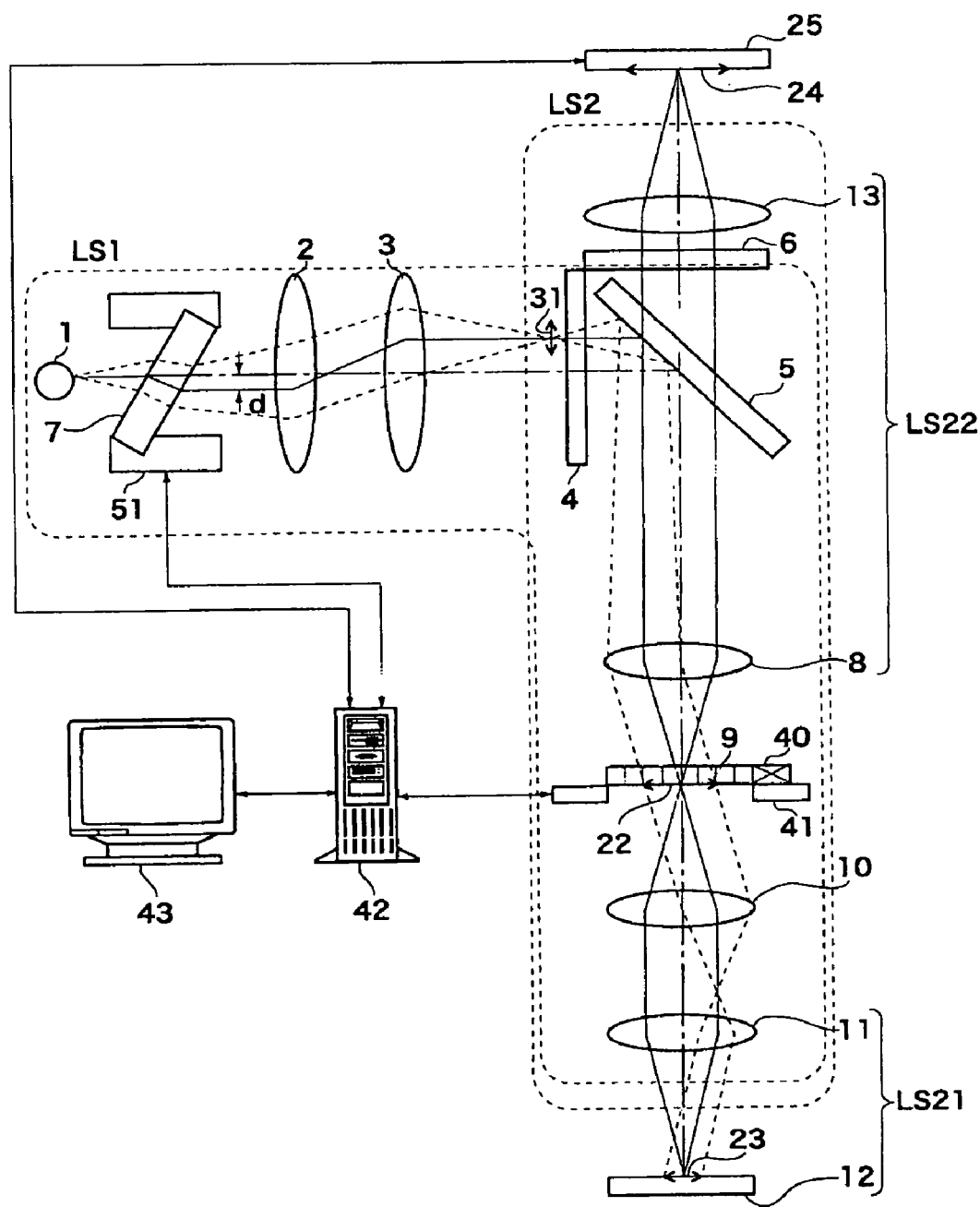
FIG. 3 is a view showing an outline of an optical system of a microscope apparatus according to a second embodiment of the invention.

FIG. 3 is a view showing an outline of an optical system of a microscope apparatus according to a second embodiment of the invention.

The second embodiment of the invention will be described below. In the following drawings, the same component as that shown in the drawings is designated by the same numeral, and sometimes the description is omitted. The second embodiment differs from the first embodiment in that the parallel-plate glass 7 is disposed immediately behind the light source 1. In the first embodiment, the parallel-plate glass 7 is disposed behind the dichroic mirror 5 as shown in FIG. 1. Even in the configuration of FIG. 3, the on-axis ray can be shifted from the optical axis by the parallel-plate glass 7 such that, in the light diffracted by the diffraction grating 9, the zero-order light D0 and the first-order light D1 are symmetrically generated with respect to the optical axis of the objective lens. The necessary shift amount d can be obtained by computation from the wavelength of the light source 1, a synthesized focal distance of the collector lens 2, collimator lens 3, and lens 8, and the pitch of the diffraction grating 9. Parameters of the parallel plate can also be obtained by computation in order to achieve the necessary shift amount d.

Assuming that λ is the wavelength of the light source 1, $f_g$ is the synthesized focal distance of the collector lens 2, collimator lens 3, and lens 8, and $P_g$ is the pitch of the diffraction grating 9, the necessary shift amount d is obtained by the equation (1). Assuming that n is the refractive index of the parallel-plate glass 7, t is the thickness of the parallel-plate glass 7, and α is the tilt angle of the parallel-plate glass 7, the amount d shifted from the optical axis of the on-axis ray by the parallel-plate glass 7 is obtained by the equation (2). Accordingly, the configuration of the optical system satisfying the equations (1) and (2) enables the zero-order light D0 and the first-order light D1 to be symmetrically generated with respect to the optical axis of the objective lens in the lights diffracted by the diffraction grating 9.

In rotating the diffraction grating 9 to change the structured illumination direction, it is necessary that the light source image 31 be rotated by the same angle to rotate the direction of the oblique illumination. Therefore, it is necessary that the parallel-plate glass 7 be rotated about the optical axis by the same angle as the rotation angle of the diffraction grating 9. The parallel-plate glass is placed on the rotary stage 51, and the parallel-plate glass is controlled in synchronization with the drive of the rotary stage 41 of the diffraction grating 9 by the control and operation device 42, thereby realizing the rotation of the parallel-plate glass 7. In the second embodiment, because a mechanism for rotating the parallel-plate glass 7 is disposed while separated from the objective optical system, there is an advantage vibration created by the rotation of the parallel-plate glass 7 is hardly transmitted to the objective optical system.

Figure 4:
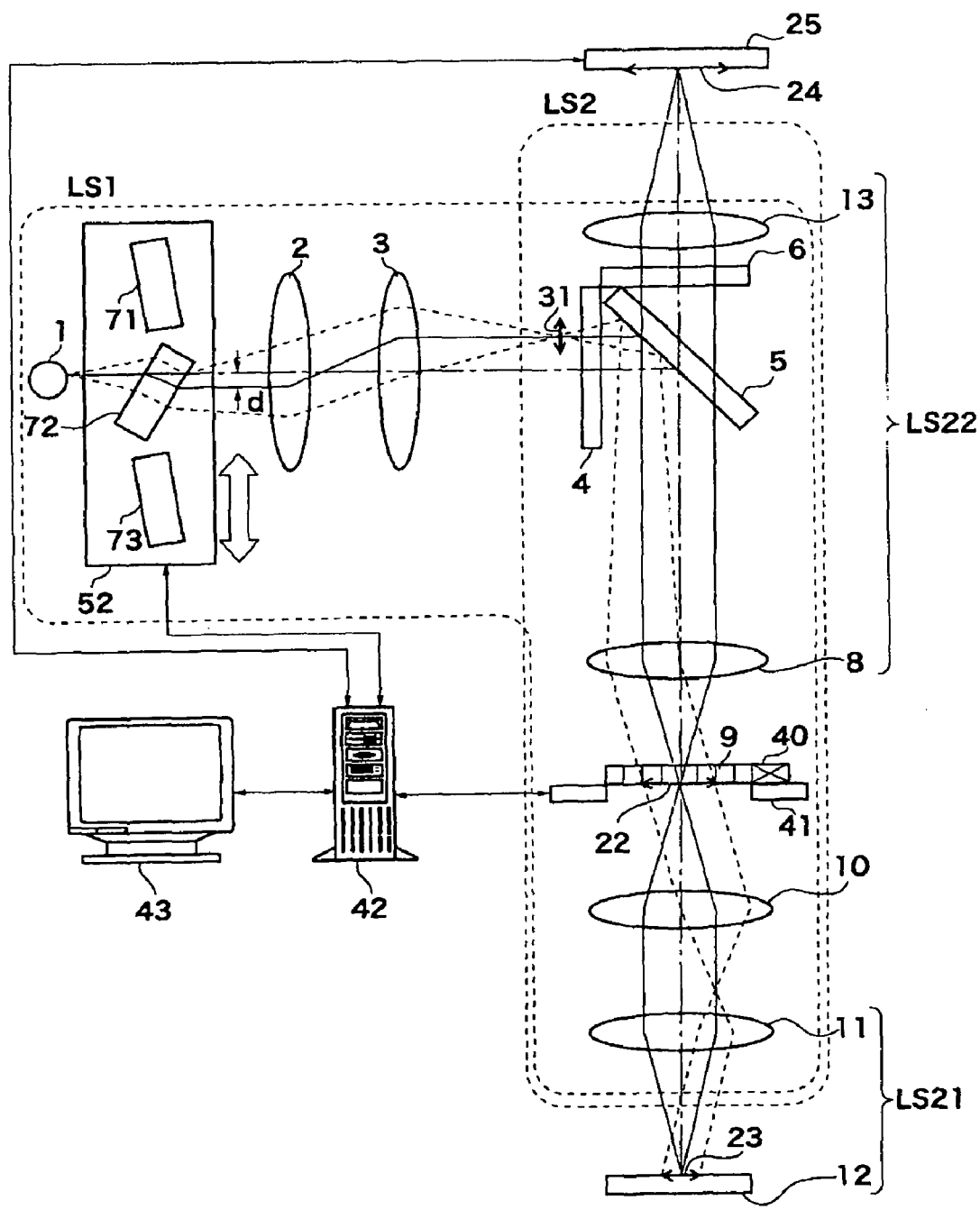
FIG. 4 is a view showing an outline of an optical system of a microscope apparatus according to a third embodiment of the invention.

FIG. 4 is a view showing an outline of an optical system of a microscope apparatus according to a third embodiment of the invention. In the second embodiment, in rotating the diffraction grating 9 of FIG. 3, it is necessary that the parallel-plate glass 7 be rotated about the optical axis by the rotary stage 51. On the other hand, in the third embodiment, a position at which the diffraction grating is stopped is previously determined, parallel-plate glasses 71, 72, and 73 rotated by the tilt angle α about the direction of the grating line are prepared for each stop angle, and the oblique illumination direction is selected by selecting one of the parallel-plate glass 71, 72, and 73 in accordance with the angle at which the rotation of the diffraction grating 9 is stopped.

Actually three directions are enough for the rotation of the diffraction grating 9, and the same function is obtained because of the one-dimensional diffraction grating even if the diffraction grating 9 is rotated by 180°. The three parallel-plate glasses 71, 72, and 73 are placed on the motor-driven stage 52 such that an angle about the optical axis of the light source image 31 becomes θ1, θ2, and θ3 satisfying an equation (3).

$$\theta_3 - \theta_2 = \theta_2 - \theta_1 = 60°  \qquad (3)$$

The motor-driven stage 52 is slid such that each of the parallel-plate glasses 71, 72, and 73 enters the optical path when the angle of the diffraction grating becomes θ1, θ2, and θ3. Therefore, the oblique illumination direction can be selected by selecting one of the parallel-plate glasses 71, 72, and 73 in accordance with the angle at which the rotation of the diffraction grating 9 is stopped. In the third embodiment, when the angles of the parallel-plate glasses 71, 72, and 73 are accurately adjusted at the beginning, advantageously good repeatability is obtained after that.

Figure 5:
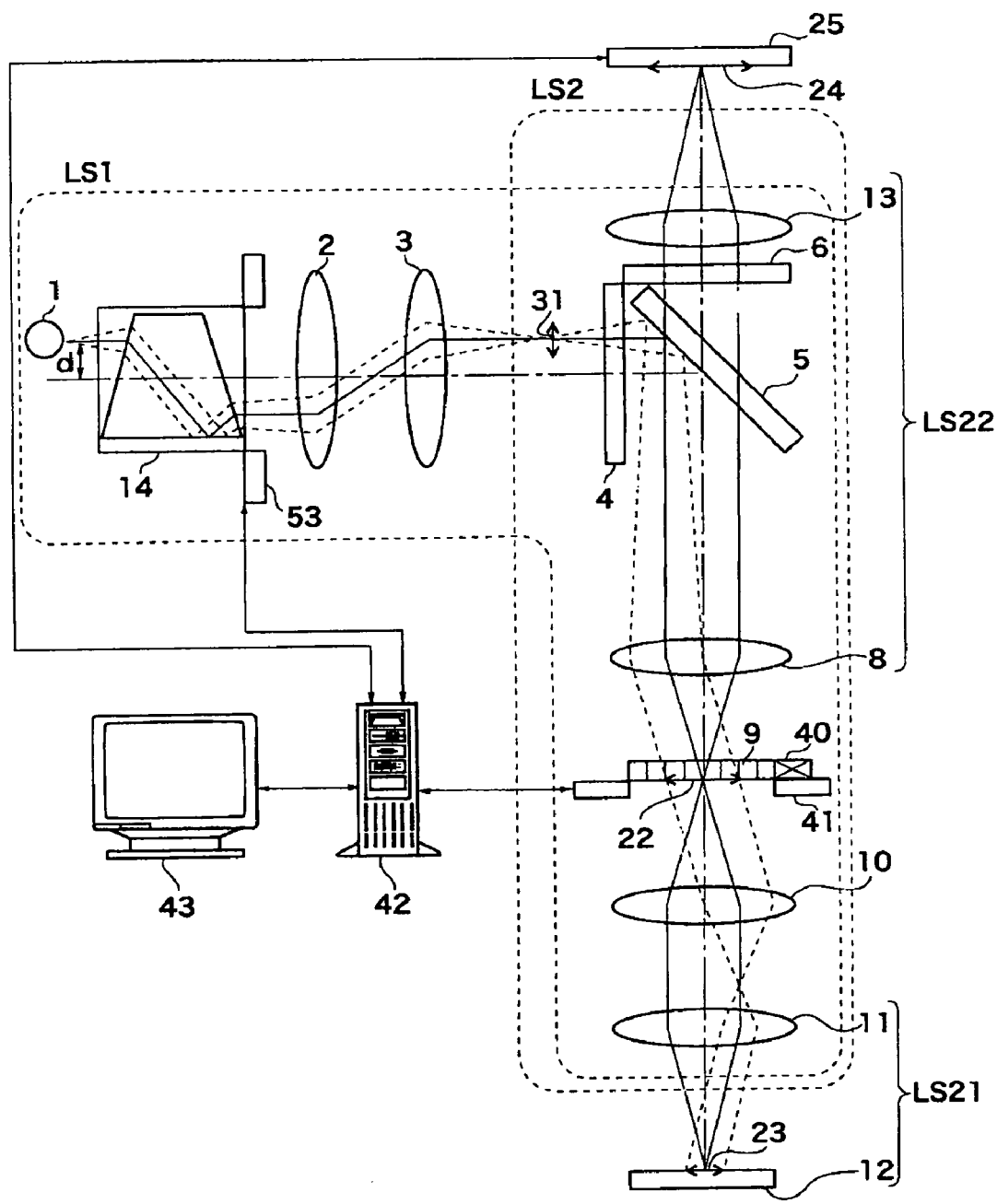
FIG. 5 is a view showing an outline of an optical system of a microscope apparatus according to a fourth embodiment of the invention.

FIG. 5 is a view showing an outline of an optical system of a microscope apparatus according to a fourth embodiment of the invention. The fourth embodiment differs from the second embodiment in that an image rotator 14 is disposed instead of the parallel-plate glass 7 of FIG. 3 and the light source 1 is shifted from the optical axis (center axes of the collector lens and collimator lens 3). Therefore, in the lights diffracted by the diffraction grating 9, the on-axis ray can be shifted from the optical axis such that the zero-order light D0 and the first-order light D1 are symmetrically generated with respect to the optical axis of the objective lens. At this point, required shift amount d of the light source 1 is expressed by the equation (1).

In rotating the diffraction grating 9, it is necessary that the light source image 31 be rotated by the same angle. Therefore, it is necessary that the image rotator 14 be rotated about the optical axis by a half of the rotation angle of the diffraction grating 9. The image rotator 14 is placed on a rotary stage 53, and the image rotator 14 is controlled in synchronization with the drive of the rotary stage 41 of the diffraction grating 9 by the control and operation device 42, thereby realizing the rotation of the image rotator 14. In the fourth embodiment, because the rotation angle of the image rotator 14 is a half of the rotation angle of the diffraction grating 9, advantageously the rotation amount of the rotary stage is suppressed. Alternatively, while the image rotator 14 is not used, the light source 1 may be rotated about the optical axis by the same rotation angle as the diffraction grating 9.

Figure 6:
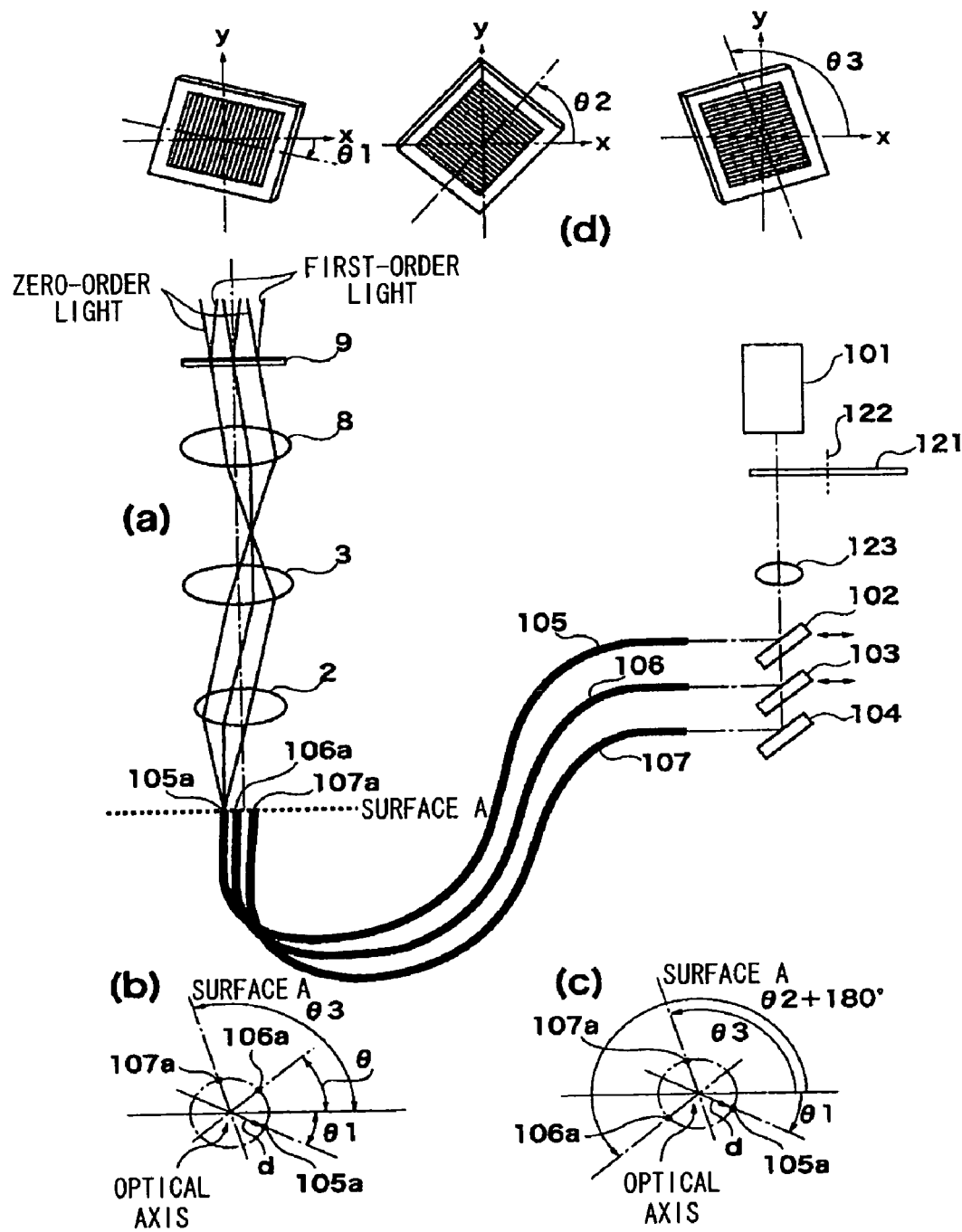
FIG. 6 is a conceptual view showing an optical system from a light source to a diffraction grating in an optical system of a microscope apparatus according to a fifth embodiment of the invention.

FIG. 6 is a conceptual view showing the optical system from the light source 1 to the diffraction grating 9 in an optical system of a microscope apparatus according to a fifth embodiment of the invention. In FIG. 6, only the mutual relationship is shown while the actual arrangement of the components is neglected. The positional relationship among the components is similar to that of FIG. 5 except for the light source portion. However, the exciter filter 4 and the dichroic mirror 5 are omitted in FIG. 6.

As shown in FIG. 6(a), the light emitted from a light source 101 such as a laser diode is folded by one of mirrors 102, 103, and 104 and incident to one of optical fibers 105, 106, and 107. In the light exiting from one of exit ends 105a, 106a, and 107a of the optical fibers 105, 106, and 107, one of exit ends 105a, 106a, and 107a is used as the secondary light source. The diffraction grating 9 is illuminated with the light exiting from one of exit ends 105a, 106a, and 107a through the collector lens 2, the collimator lens 3, and the lens 8, and the zero-order light and the first-order light are symmetrically generated with respect to the optical axis.

In the case where the light source 101 is formed by the laser diode, the laser beam is not expanded, and it is necessary to reduce a coherent noise. Therefore, a rotary diffuser 121 is inserted in the optical path. The rotary diffuser 121 rotates a disc-shape diffuser about an axis 122 at high speed. The light flux that is diffused and expanded by the rotary diffuser 121 is efficiently guided to the optical fibers 105, 106, and 107 using a coupling lens 123, and a diameter of the light flux on the rotary diffuser 121 can be formed on an incident end face of the optical fiber with proper magnification. Therefore, the laser beam can be expanded to prevent the coherent noise while the light quantity loss is suppressed.

An output light quantity of the light source can be reduced to a light quantity necessary for the optical system by inserting an ND filter or a well-known attenuator between the light source 101 and the rotary diffuser 121.

Actually the three directions are enough for the rotation of the diffraction grating 9 (FIG. 6(d)). Accordingly, as shown in FIG. 6(b), in an exit end surface A of the optical fiber, the three optical fiber ends are fixed to positions that are eccentric by d from the optical axis at the angles θ1, θ2, and θ3 satisfying the equation (3).

$$\theta 3-\theta 2=\theta 2-\theta 1=60° \quad (3)$$

Without regard to the right and left of the zero-order light and first-order light, as shown in FIG. 3(c), the exit end 106a can be inverted from the position of FIG. 6(b) to the position of θ2+180° to fix the three optical fiber ends with good balance. At this point, any one of the angles θ1, θ2, and θ3 may be rotated by 180 degrees.

The mirrors 102 and 103 are arranged to be removed from the optical path for selective use. The mirror 102 is inserted when the diffraction grating 9 is at the angle θ1, the mirror 102 is removed to insert the mirror 103 when the diffraction grating 9 is at the angle θ2, and the mirrors 102 and 103 are removed when the diffraction grating 9 is at the angle θ3. Therefore, the optical fiber end can be disposed at the corresponding angle and the oblique illumination direction can be rotated according to the rotation of the diffraction grating.

In the fifth embodiment, because the movable portion is separated from the microscope main body while the optical fiber interposed therebetween, advantageously the vibration is hardly transmitted.

Figure 7:
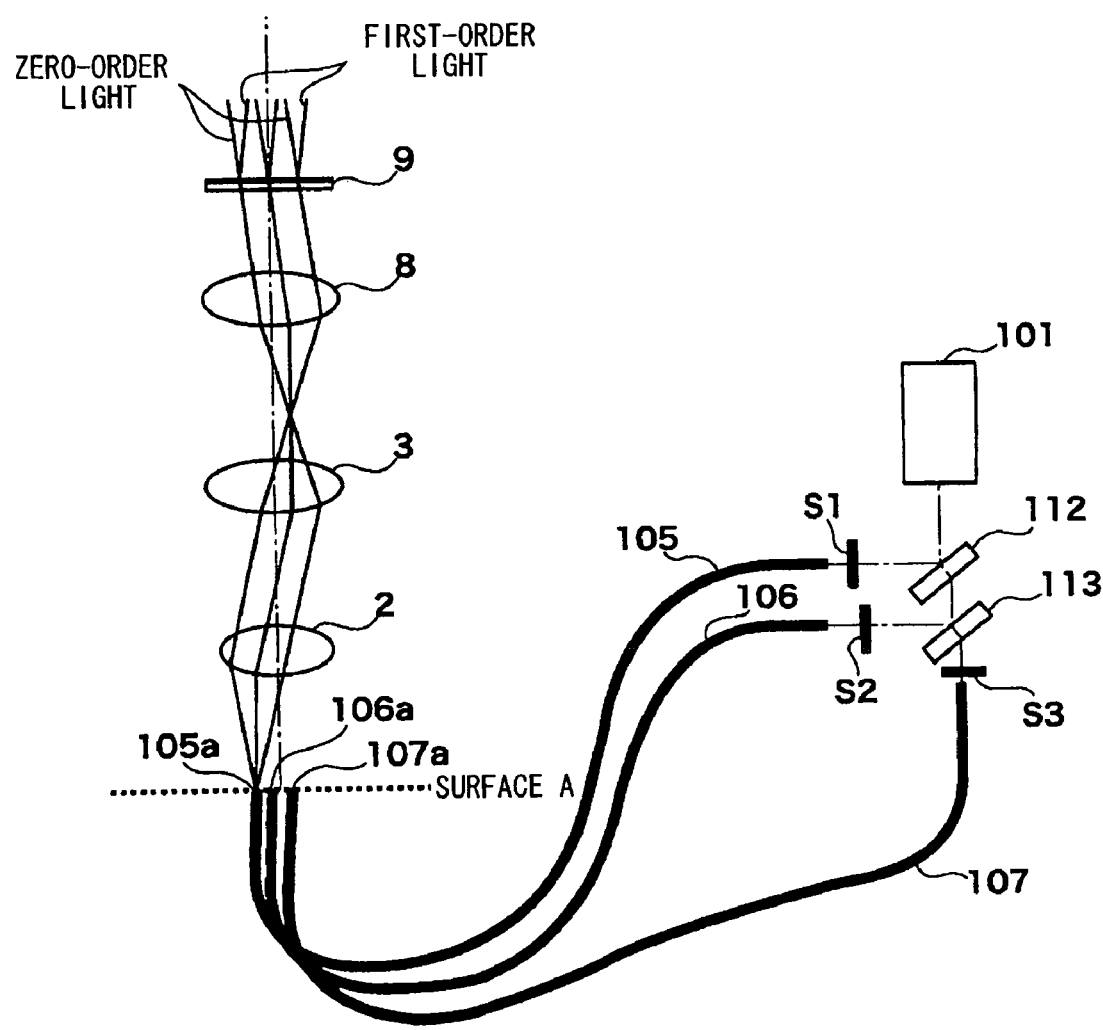
FIG. 7 is a conceptual view showing an optical system from a light source to a diffraction grating in an optical system of a microscope apparatus according to a sixth embodiment of the invention.

FIG. 7 is a conceptual view showing the optical system from the light source 1 to the diffraction grating 9 in an optical system of a microscope apparatus according to a sixth embodiment of the invention. In FIG. 7, only the mutual relationship is shown while the actual arrangement of the components is neglected. The positional relationship among the components is similar to that of FIG. 5 except for the light source portion. However, the exciter filter 4 and the dichroic mirror 5 are omitted in FIG. 7.

The sixth embodiment differs from the fifth embodiment in that beam splitters 112 and 113 are disposed instead of the mirrors 102, 103, and 104 to equally divide the light quantity of the light emitted from the light source into the optical fibers 105, 106, and 107. Shutters S1, S2, and S3 are disposed in front of the optical fibers, and only the shutter of the corresponding optical path is opened according to the change of the direction of the diffraction grating 9. That is, only the shutter S1 is opened while the shutters S2 and S3 are closed when the diffraction grating 9 is at the angle θ1, only the shutter S2 is opened while the shutters S1 and S3 are closed when the diffraction grating 9 is at the angle θ2, and only the shutter S3 is opened while the shutters S1 and S2 are closed when the diffraction grating 9 is at the angle θ3. In the sixth embodiment, because the movable portion is formed only by the shutters, the switching can be performed at high speed.

Although three optical fibers 105, 106, and 107 are separately shown in FIGS. 6 and 7, the invention is not limited to the drawings. For example, three optical fibers may be bundled, or an optical fiber in which three cores are disposed in one clad may be utilized.

In the microscope apparatus of each embodiment, the image picking-up device 25 detects the relayed re-modulated image (magnified image 24). Alternatively, the magnified image 24 may be modified to be observed with the naked eye through an eyepiece.

In the microscope apparatus of each embodiment, the diffraction grating is used as the spatial modulation element. Alternatively, another spatial modulation element that similarly acts for the incident light flux may be used. For example, when a spatial modulation element such as a transmission type liquid crystal device is used instead of the diffraction grating 9, because the phase change and the orientation change of the structured illumination is electrically performed, the microscope apparatus can be configured with no use of the actuator or the rotary stage, and therefore the information on the super-resolution image can be obtained at higher speed. Although the microscope apparatus of each embodiment is applied to the fluorescent microscope, the invention is not limited to the fluorescent microscope. The microscope apparatus of the invention can also be applied to a reflection microscope.

Figure 8:
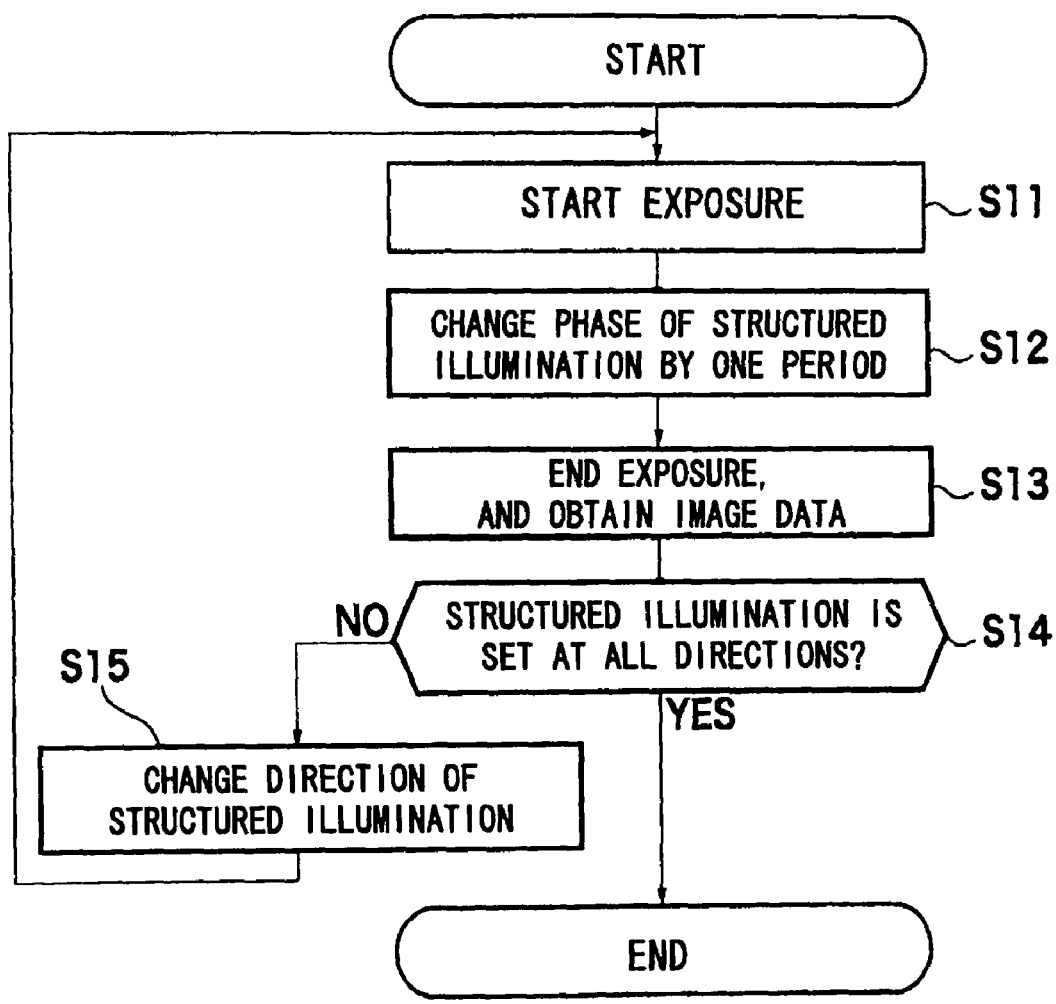
FIG. 8 is a flowchart showing a behavior relating to control of a control and operation device.

A behavior relating to control of the control and operation device 42 shown in FIGS. 1 to 5 will be described below. FIG. 8 is a flowchart showing the behavior relating to the control of the control and operation device 42. As shown in FIG. 8, when obtaining the image data of the re-modulated image, the control and operation device 42 changes the phase of the structured illumination by one period (Step S12) during an interval from the start of exposure of the image picking-up device 25 (Step S11) to the end of exposure (Step S13).

The obtained image data is time integration of the re-modulated image in the phase change of the structured illumination, and the luminance distribution of the structured illumination has the sinusoidal shape. Therefore, the structured illumination pattern is eliminated from the image data. The unnecessary diffraction components generated in the re-modulation are also eliminated from the image data. Therefore, the image data exhibits the demodulated image. As described above, some methods can be applied to the elimination of the structured illumination pattern or unnecessary diffraction components.

After the control and operation device 42 changes the direction of the structured illumination (Step S15), the control and operation device 42 performs the pieces of processing in Steps S11 to S13 to obtain image data of another demodulated image in which the structured illumination pattern is eliminated.

The pieces of processing in Steps S11 to S13 for obtaining the image data of the demodulated image are repeated until the direction of the structured illumination is set for all the predetermined directions (YES in Step S14), and the image data of the demodulated image in which the structured illumination pattern is eliminated is obtained for as many as the orientation is set.

For example, the control and operation device 42 repeats the pieces of processing in Steps S11 to S13 until the direction of the structured illumination is set for the three directions 0°, 120°, and 240°, and the control and operation device 42 obtains pieces of image data $I_1$, $I_2$, and $I_3$ of the three demodulated image in which the structured illumination pattern is eliminated. The pieces of image data $I_1$, $I_2$, and $I_3$ of the three demodulated images differ from one another in the direction of the super-resolution by 120°.

Figure 9:
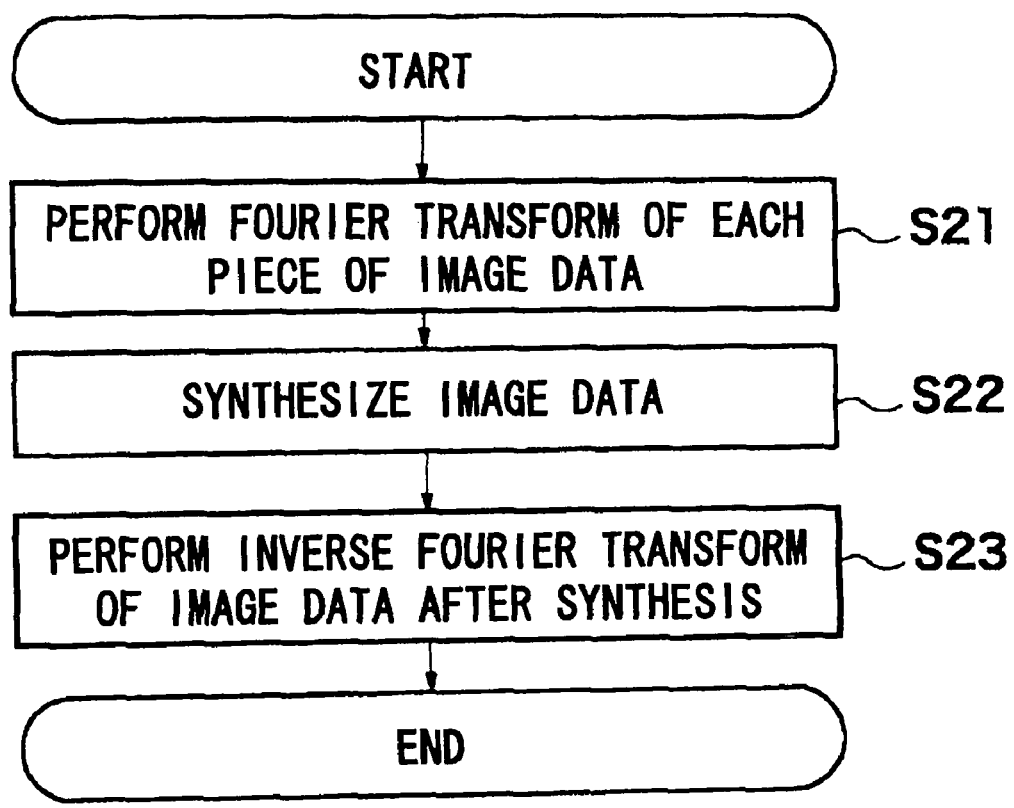
FIG. 9 is a flowchart showing a behavior relating to operation of the control and operation device.

FIG. 9 is a flowchart showing a behavior relating to operation of the control and operation device 42. The operation in obtaining the pieces of image data $I_1$, $I_2$, and $I_3$ of the three demodulated images which directions of the super-resolution differ from one another by 120° will be described below.

Figure 10:
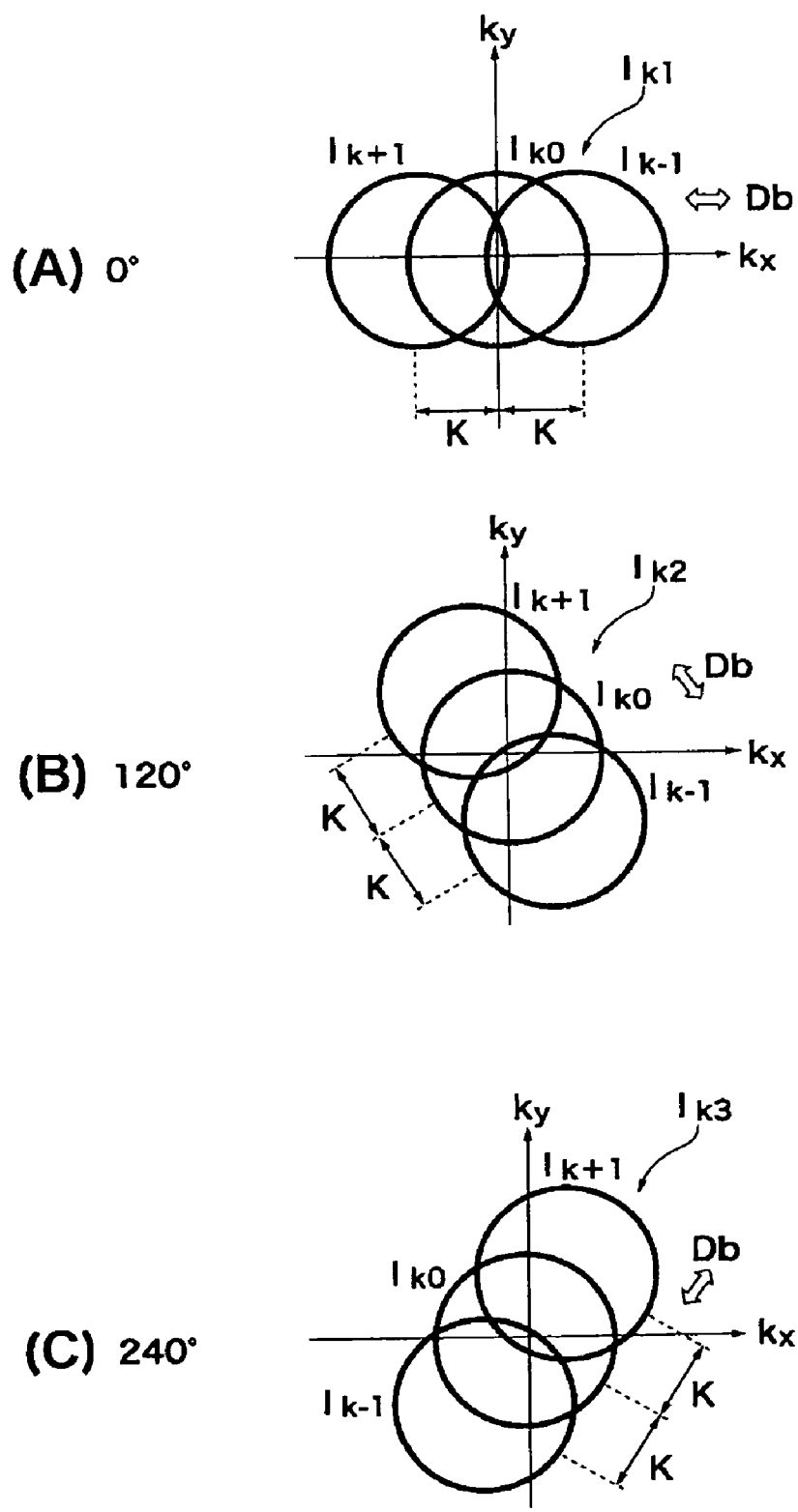
FIG. 10 is a view showing image data of a demodulated image.

The control and operation device 42 performs Fourier transform to each of the pieces of image data $I_1$, $I_2$, and $I_3$ of the three demodulated images to obtain pieces of image data $I_{k1}$, $I_{k2}$, and $I_{k3}$ of the three demodulated images expressed in terms of wave number space (Step S21). FIGS. 10(*a*), 10(*b*), and 10(*c*) show the pieces of image data $I_{k1}$, $I_{k2}$, and $I_{k3}$ of the three demodulated images.

In FIGS. 10(*a*), 10(*b*), and 10(*c*), numerals $I_{k+1}$ and $I_{k-1}$ designate components (positive and negative first-order modulation components) transmitted by the objective optical system LS21 in the modulated state (as positive and negative first-order light), the numeral $I_{k0}$ designate a component (zero-order modulation component) transmitted by the objective optical system LS21 in the non-modulated state (as zero-order light). Each circle indicates a region where MTF (Modulation Transfer Function) is not zero. The numeral Db designates the direction of the super-resolution (the direction of the structured illumination), and the numeral K designates a spatial frequency of the structured illumination.

Figure 11:
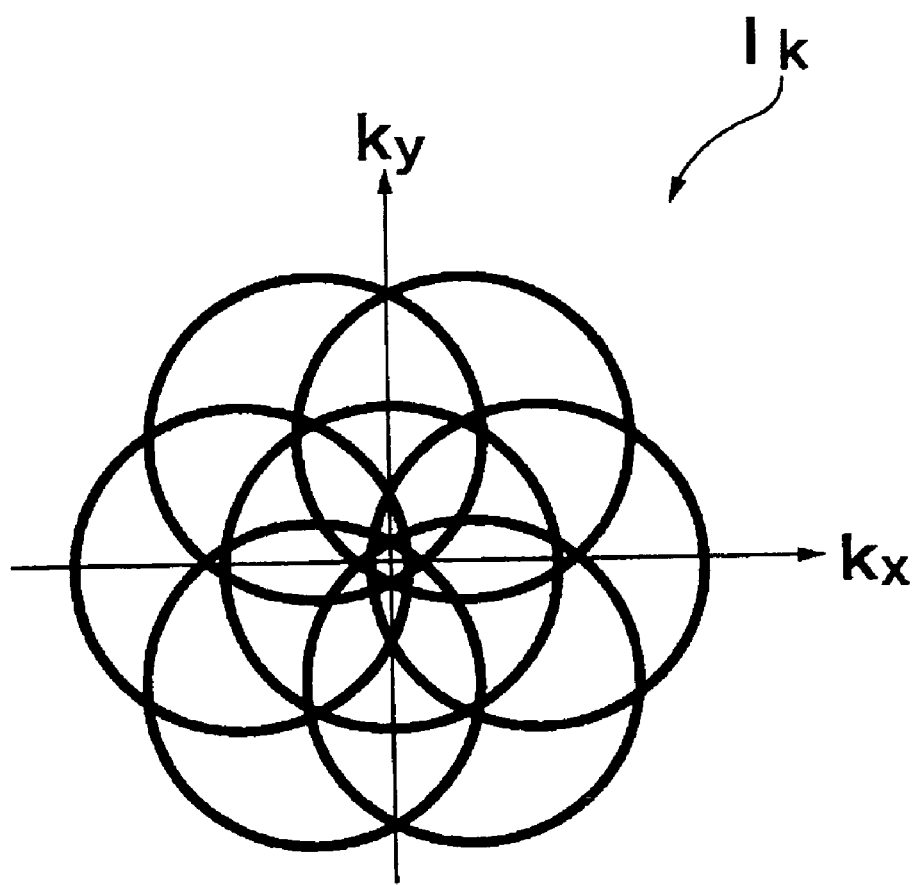
FIG. 11 is a view showing a state in which pieces of image data demodulated in three directions are synthesized.

As shown in FIG. 11, the control and operation device 42 synthesizes the pieces of image data $I_{k1}$, $I_{k2}$, and $I_{k3}$ of the three demodulated images on the wave number space to obtain one piece of synthesized image data $I_k$ (Step S22). Although the operation can be performed by simple addition, desirably deconvolution processing is performed in consideration of MTF. A technique in which a Wiener filter is utilized can be cited as an example of the deconvolution processing. At this point, the synthesized image data $I_k$ is computed as a function of a frequency f:

$$I_k(f) = \frac{\sum_j I_{kj}(f) \times MTF_j^*(f)}{\sum_j |MTF_j(f)|^2 + C} \quad (4)$$

Where j is directions (0°, 120°, and 240°) of the diffraction grating 9, and $MTF_j(f)$ is effective MTF in each direction of the diffraction grating after the demodulation. $MTF_j(f)$ is expressed by the following equation (5) using NTF(f) of the objective optical system:

$$MTF_j(f) = (G_0 + 2G_1)MTF(f) + \sqrt{G_0 G_1}MTF(f+f_j) + \sqrt{G_0 G_1}MTF(f-f_j) \quad (5)$$

where $G_0$ and $G_1$ are zero-order diffraction efficiency and first-order diffraction efficiency of the diffraction grating and $f_j$ is a modulation frequency of the diffraction grating. The notation * of $MTF^*_j(f)$ indicate that MTF is a complex number.

$I_{kj}(f)$ is a signal intensity of a j-th image at the spatial frequency f, and C is a constant determined from the power spectrum of a noise.

The processing prevents the contribution of the low-frequency component of the synthesized image data $I_k$ from excessively enlarging, so that the decrease in relative contribution of the high-frequency component can be prevented.

Then the control and operation device 42 performs inverse Fourier transform to the synthesized image data $I_k$ to obtain image data I expressed by a real space. The image data I expresses a super-resolution image of the specimen 12 across the three directions whose angles are changed by 120° (Step S23). The control and operation device 42 supplies the image data I to the image display device 43 to display the super-resolution image.

Thus, in the microscope apparatus of the embodiments, the light from the specimen 12 is re-modulated by the diffraction grating 9, and the diffraction grating 9 is moved to perform the averaging to remove the unnecessary diffraction component, thereby obtaining the demodulated image. Accordingly, because the demodulation operation is not performed, the image data of the demodulated image is obtained faster.

Additionally, because the same region of the same diffraction grating 9 is used for both the modulation and the re-modulation, even if a shape error, an arrangement error, or an error of the rotation angle exists in the diffraction grating 9, the pattern of the modulation can be equalized to the pattern of the re-modulation. Accordingly, the shape error, the arrangement error, or the error of the rotation angle existing in the diffraction grating 9 hardly imparts a noise to the image data of the demodulated image. The same holds true for the phase change of the structured illumination and the direction change of the structured illumination. Accordingly, in the microscope apparatus of the invention, the super-resolution image is obtained with high accuracy.

In the microscope apparatus of the invention, the deconvolution is performed when the plural pieces of image data are synthesized (Step S22 of FIG. 9), so that the good super-resolution image having small attenuation of the high-frequency component can be obtained.

What is claimed is:

1. A microscope apparatus comprising:
    a spatial modulation element that receives irradiation light of an obliquely incident substantially parallel light flux to symmetrically generate zero-order light and first-order light with respect to an optical axis of the spatial modulation element, the irradiation light being of zero-order light;
    an objective optical system that causes the zero-order light and the first-order light to interfere with each other on a sample surface to form an interference fringe, the objective optical system forming an image of light from the sample surface on the spatial modulation element surface, the light from the sample surface being modulated by the interference fringe;
    image picking-up means; and
    a relay optical system that forms an image of light re-modulated by the spatial modulation element surface on an image picking-up surface of the image picking-up means.

2. The microscope apparatus according to claim 1, wherein an optical axis of an optical system in which the objective optical system and the relay optical system are combined is identical to an optical axis of an illumination optical system from a light source to the sample surface at least in a range from a site located on a light source side of the spatial modulation element to the sample surface, and
    the microscope apparatus includes:
    an optical path moving optical system that shift a center axis of illumination light emitted from the light source from the identical optical axis; and
    an irradiation optical system that converts the illumination light passing through the optical path moving optical system into irradiation light having a substantially parallel light flux, the irradiation light being obliquely incident to the spatial modulation element.

3. The microscope apparatus according to claim 2, wherein the irradiation optical system is a part of the relay optical system.

4. The microscope apparatus according to claim 2, comprising:
    a collector lens that converts divergent illumination light from the light source into a substantially parallel light flux;
    a collimator lens that collects the illumination light transmitted through the collector lens to form a secondary light source; and
    an optical path deflecting member that reflects the illumination light transmitted through the collimator lens to cause a principal ray of the reflected illumination light to travel in a direction of the sample surface on the optical axis of the relay optical system, the optical path deflecting member causing the principal ray to impinge on the optical path moving optical system,
    wherein the principal ray of the illumination light is incident to the optical path moving optical system through a center of the collector lens, a center of the collimator lens, and the optical axis of the relay optical system.

5. The microscope apparatus according to claim 2, comprising:
    a collector lens that converts illumination light divergent from the light source into a substantially parallel light flux;
    a collimator lens that collects the illumination light transmitted through the collector lens to form a secondary light source; and
    an optical path deflecting member that reflects the illumination light transmitted through the collimator lens to cause a principal ray of the reflected illumination light to travel in a direction of the sample surface parallel to the optical axis of the relay optical system, the optical path deflecting member causing the principal ray to impinge on the irradiation optical system,
    wherein the illumination light emitted from the light source is incident to the collector lens after passing through the optical path moving optical system, and the illumination light is incident to the irradiation optical system after reflected from the optical path deflecting member.

6. The microscope apparatus according to claim 2, wherein the spatial modulation element can be rotated about the optical axis, the optical path moving optical system can be rotated about the optical axis, and a rotation amount of the spatial modulation element can be set equal to a rotation amount of the principal ray that is rotated when the optical path moving optical system is rotated.

7. An image processing method comprising:
    picking up a plurality of images of a sample with the microscope apparatus according to claim 6 while the rotation amount of the spatial modulation element is changed;
    performing Fourier transform to a plurality of pieces of obtained image data to obtain a plurality of pieces of Fourier transform image data;
    performing deconvolution processing to the plurality of pieces of Fourier transform image data on a two-dimensional plane in consideration of MTF (Modulation Transfer Function) to synthesize the plurality of pieces of Fourier transform image data; and
    performing inverse Fourier transform to obtain image data.

8. The microscope apparatus according to claim 2, wherein the spatial modulation element can be rotated about the optical axis, a plurality of optical elements that move the optical path are provided in the optical path moving optical system, the plurality of optical elements respectively move the optical path in different directions perpendicular to the optical axis, and one of the plurality of optical elements can be selected for use according to a rotation amount of the spatial modulation element.

9. An image processing method comprising:
- picking up a plurality of images of a sample with the microscope apparatus according to claim 8 while the rotation amount of the spatial modulation element is changed;
- performing Fourier transform to a plurality of pieces of obtained image data to obtain a plurality of pieces of Fourier transform image data;
- performing deconvolution processing to the plurality of pieces of Fourier transform image data on a two-dimensional plane in consideration of MTF (Modulation Transfer Function) to synthesize the plurality of pieces of Fourier transform image data; and
- performing inverse Fourier transform to obtain image data.

10. The microscope apparatus according to claim 1, wherein an optical axis of an optical system in which the objective optical system and the relay optical system are combined is identical to an optical axis of an illumination optical system from a light source to the sample surface in an optical axis at least in a range from a site located on a light source side of the spatial modulation element to the sample surface, and the microscope apparatus includes:
- a light source that is provided at a position distant from the optical axis of the illumination optical system;
- a collector lens that converts illumination light divergent from the light source into a substantially parallel light flux;
- a collimator lens that collects the illumination light transmitted through the collector lens to form a secondary light source;
- an optical path deflecting member that reflects the illumination light transmitted through the collimator lens to cause a principal ray of the reflected illumination light to travel in a direction of the sample surface parallel to the optical axis of the relay optical system; and
- an irradiation optical system that converts the illumination light reflected from the optical path deflecting member into irradiation light having a substantially parallel light flux, the irradiation light being obliquely incident to the spatial modulation element.

11. The microscope apparatus according to claim 10, wherein the irradiation light optical system is a part of the relay optical system.

12. The microscope apparatus according to claim 10, wherein the spatial modulation element can be rotated about the optical axis, the light source can be rotated about the optical axis of the illumination optical system, and the spatial modulation element and the light source can be set at an identical rotation amount.

13. An image processing method comprising:
- picking up a plurality of images of a sample with the microscope apparatus according to claim 12 while the rotation amount of the spatial modulation element is changed;
- performing Fourier transform to a plurality of pieces of obtained image data to obtain a plurality of pieces of Fourier transform image data;
- performing deconvolution processing to the plurality of pieces of Fourier transform image data on a two-dimensional plane in consideration of MTF (Modulation Transfer Function) to synthesize the plurality of pieces of Fourier transform image data; and
- performing inverse Fourier transform to obtain image data.

14. The microscope apparatus according to claim 10, wherein the spatial modulation element can be rotated about the optical axis, a plurality of light sources are provided, the plurality of light sources respectively move the optical path in different directions perpendicular to the optical axis, and one of the plurality of light sources can be selected for use according to a rotation amount of the spatial modulation element.

15. An image processing method comprising:
- picking up a plurality of images of a sample with the microscope apparatus according to claim 14 while the rotation amount of the spatial modulation element is changed;
- performing Fourier transform to a plurality of pieces of obtained image data to obtain a plurality of pieces of Fourier transform image data;
- performing deconvolution processing to the plurality of pieces of Fourier transform image data on a two-dimensional plane in consideration of MTF (Modulation Transfer Function) to synthesize the plurality of pieces of Fourier transform image data; and
- performing inverse Fourier transform to obtain image data.

16. The microscope apparatus according to claim 1, wherein a phase of the interference fringe formed on the sample surface by the spatial modulation element and the objective optical system can be changed, and
- an imaging time of the image picking-up means is substantially same as an integral multiple of a period for phase changing.

* * * * *